G. W. ROBERTSON.
CORNCRIB VENTILATOR AND DRIER.
APPLICATION FILED MAY 7, 1919.
1,431,046.
Patented Oct. 3, 1922.
3 SHEETS—SHEET 3.
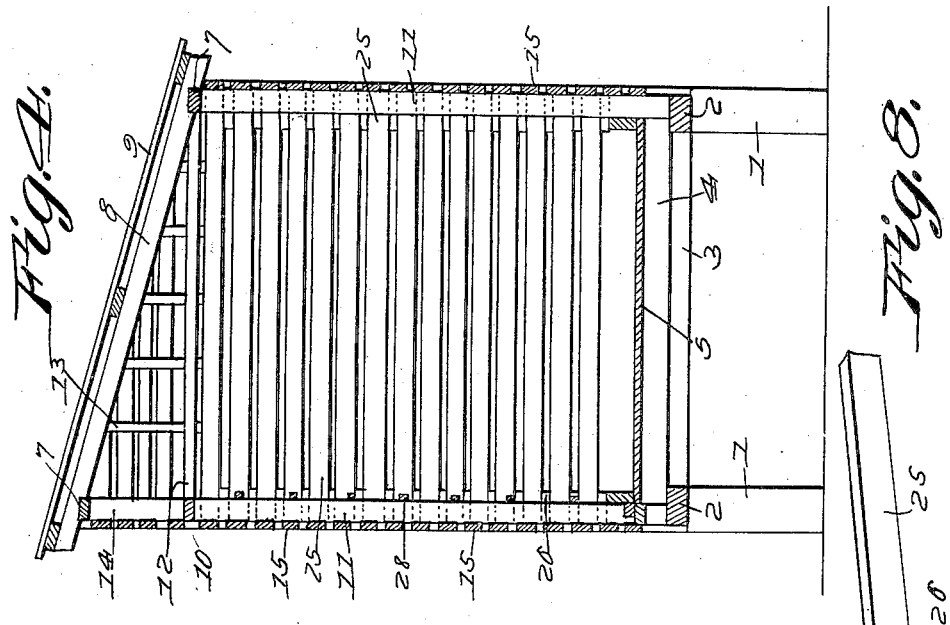
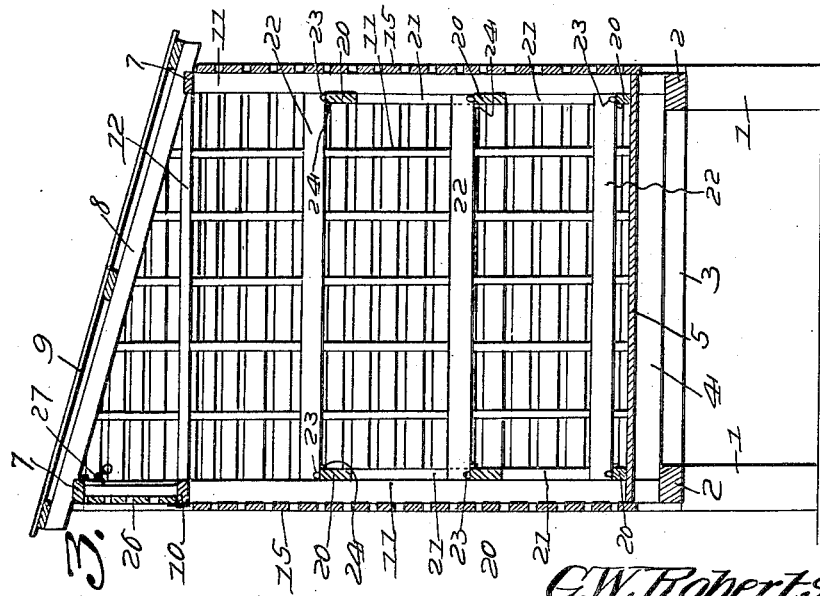
Inventor
G. W. Robertson,
By
Attorney Patented Oct. 3, 1922.

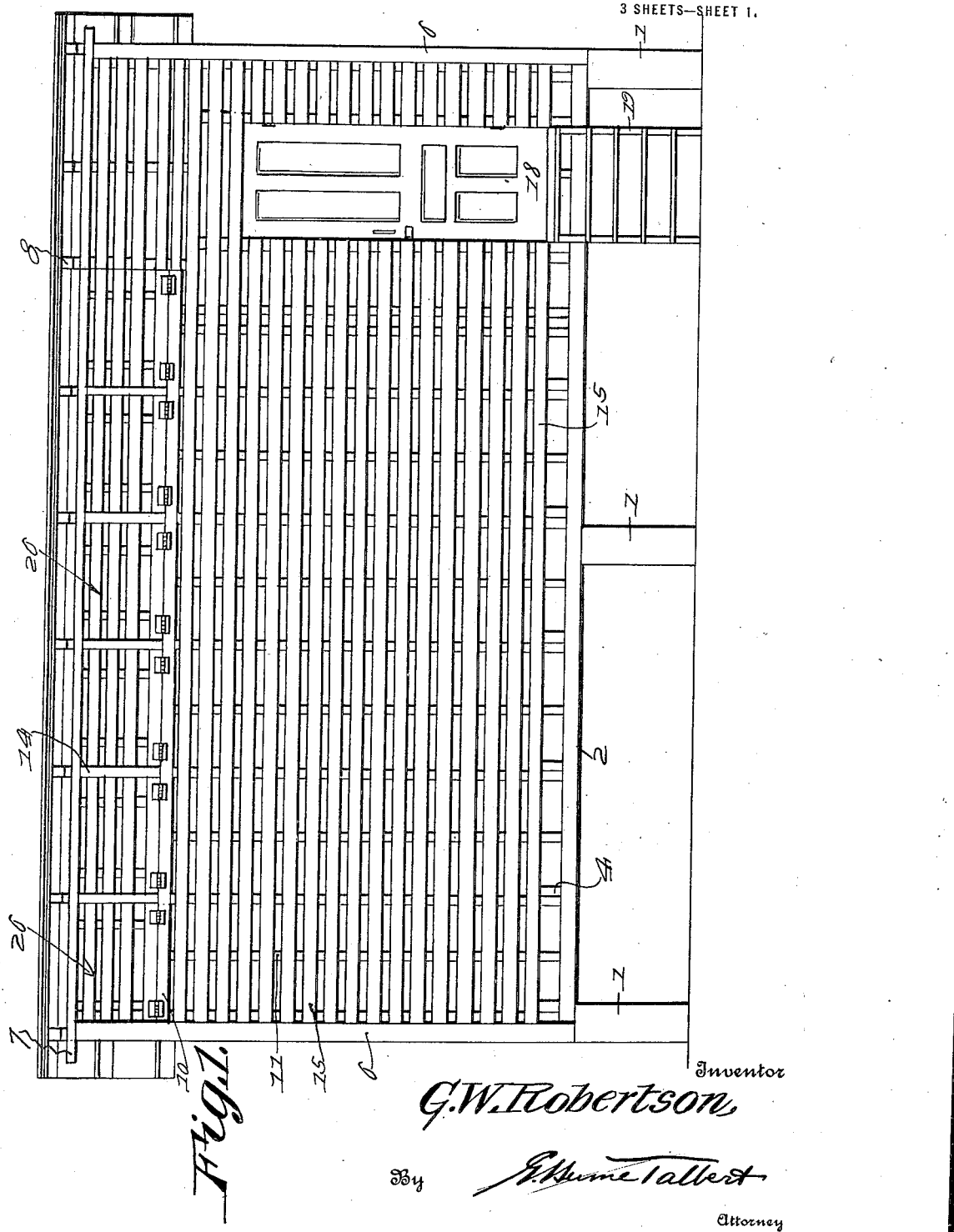

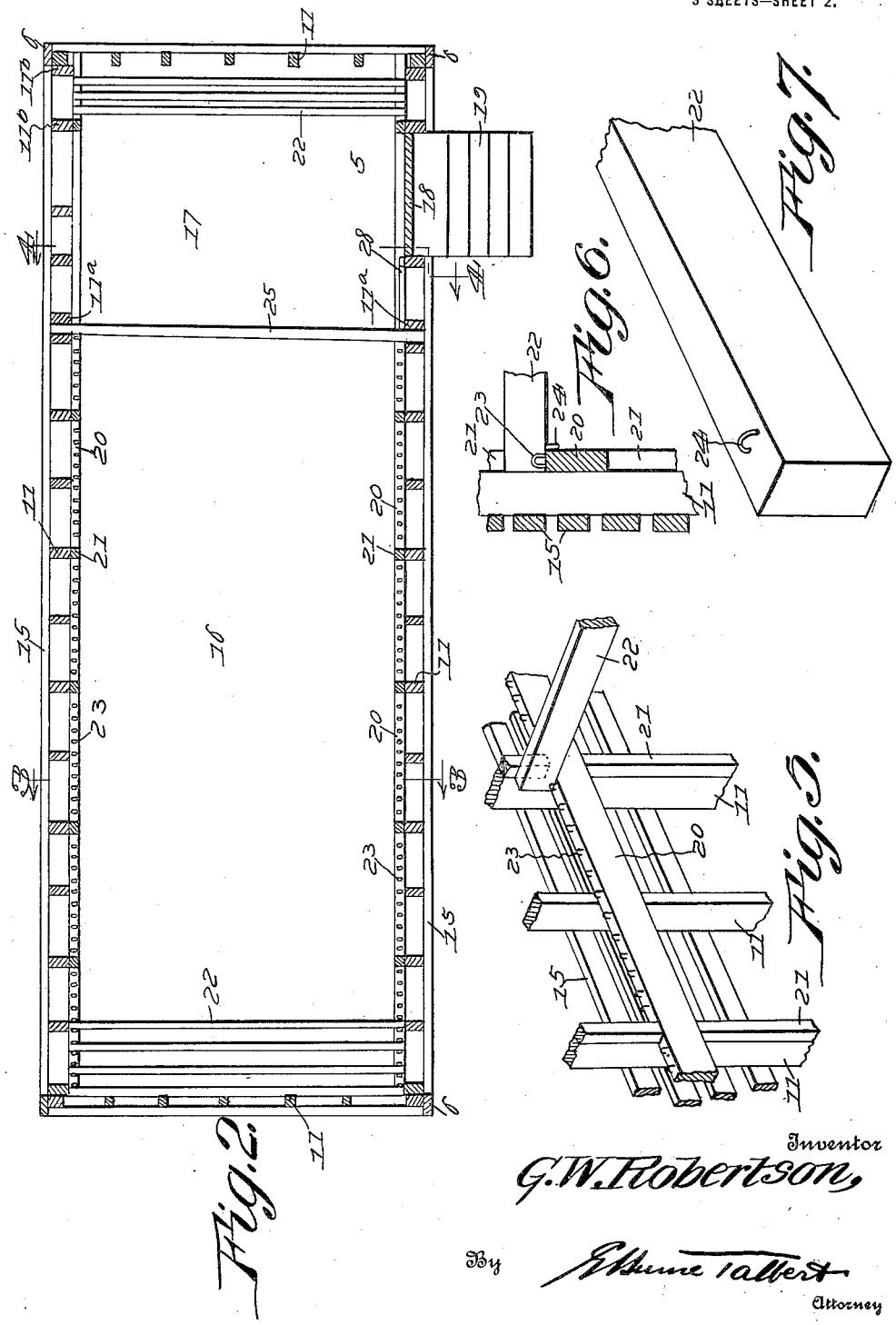

1,431,046

UNITED STATES PATENT OFFICE.

GEORGE W. ROBERTSON, OF CULPEPER, VIRGINIA.

CORNCRIB VENTILATOR AND DRIER.

Application filed May 7, 1919. Serial No. 295,435.

*To all whom it may concern:*

Be it known that I, GEORGE W. ROBERTSON, a citizen of the United States, residing at Culpeper, in the county of Culpeper and State of Virginia, have invented new and useful Improvements in Corncrib Ventilators and Driers, of which the following is a specification.

The object of the invention is to provide a corn crib in which corn may be placed even though the corn contains much sap when gathered, the crib being of such a construction that air is permitted to pass readily through it and around it, thus providing for the ready drying of the corn placed therein. The invention is essentially adapted for use in country having low and overflow lands where many thousands of bushels of corn are lost by overflow while waiting for the corn to dry enough to gather and bulk in the ordinary crib. The provision for quick drying which the present invention contemplates makes it possible to gather the corn in this low and overflow country at a much earlier period than has hitherto been possible. Corn can be gathered at least three weeks earlier than is customary in such country and when placed in the crib it is thoroughly dried in the latter.

A further object of the invention is to provide a crib of this character consisting of a plurality of superposed corn storing compartments or bins the bottoms of which consist of a plurality of independently removable bars. The compartments or bins may thus be readily knocked down to permit the removal of the corn with facility when desired.

Still further and other objects appear in the following description wherein the invention is set forth in detail.

To the exact construction in which it is shown and described, the invention is not to be restricted. The right is reserved to make such changes or alterations as the actual reduction to practice may suggest, in so far as such changes or alterations are compatible in spirit with the annexed claims.

The same numerals of reference designate the same parts throughout the several figures of the drawings, wherein:

Fig. 1 is a view in front elevation of the improved crib.

Fig. 2 is a horizontal sectional view therethrough.

Fig. 3 is a section on the line 3—3 of Fig. 2.

Fig. 4 is a section on the line 4—4 of Fig. 2.

Fig. 5 is a perspective detail view showing the manner in which the bars constituting the bottoms of the bins are mounted.

Fig. 6 is a sectional detail illustrating some of the features of the construction shown in Fig. 5.

Fig. 7 is a detail perspective view of one end of one of the removable bars constituting the bottom of the bin. In this figure the bar is inverted or turned upside down.

Fig. 8 is a perspective view of one end of one of the bars constituting the end wall for the bins.

Referring to the drawings, the crib is shown supported on the posts or columns 1 on which rest the side sills 2 and end sills 3. Appropriate joists 4 span the side sills to receive the flooring 5.

Corner posts 6 are provided at each of the four corners of the crib and the two on one side rise to a higher distance than do the two on the other side, each pair of front and rear posts supporting a plate 7 to provide supports for the diagonally disposed rafters 8 on top of which the roof 9 is carried. Thus it will be observed that the roof is pitched from the rear to the front.

A plate 10 is mounted between the two front corner posts 6 at the same level as the rear plate 7 and a plurality of studs 11 are mounted between this plate and the floor on the front and similarly mounted between the plate 7 and the floor on the rear. At the ends of the crib transversely disposed plates 12 are provided and extend from the rear plate 7 to the plate 10, on the front of the crib, and studs 11 are also provided at the ends of the crib and mounted between these plates 12 and the floor.

A plurality of short studs 13 are mounted between the plates 12 and the rafters at the ends of the crib and similarly a plurality of short studs 14 are attached between the plate 10 and front plate 7. The front ends and back of the crib are covered by a plurality of spaced slats 15 to provide for the free circulation of air through the crib.

On the interior, the crib is divided into a storage space 16 and an entry 17 to which latter access is had through a door 18 reached by a flight of steps 19.

In the storage space and attached to the studs 11 there are the longitudinally extending stringers 20 which are appropriately secured to the studs 11 both on the front and back walls of the crib, there being three or more of these stringers to each wall spaced one above the other a definite distance. The lower edges of the lowermost stringers 20 rest upon the floor 5 but the lower edges of the stringers above the lowermost rest upon the upper ends of strips 21 which are attached to the edges of alternate studs 11 both on the front and back wall, each strip having its lower end resting on the upper edge of the stringer below it. Thus the bending strain to which the stringers are subjected is communicated to the strips 21 in the form of a compression strain.

The stringers 20 serve as supports for transversely disposed bars 22 and in order that these bars may be held in spaced relation to each other, the stringers have attached to them on their upper edges the staples 23 which are uniformly spaced along the stringers with the intervening spaces between them equal to the thickness of the bars 22. In order that the bars when made to span any pair of front and back stringers 20 may be precluded from longitudinal movement, each bar has inserted in its under edge a staple 24 adjacent each end. Thus when the bar is disposed upon the two stringers, its two staples abut the sides of the two stringers and preclude it from longitudinal movement, the staples on top of the stringers on which the bar rests precluding lateral movement of the bar. On each pair of front and back stringers, therefore, a plurality of bars 22 may be placed and positively held in the positions in which they are placed. Thus, if all three pairs of plates have these bars placed thereon there are provided three or more compartments or bins for corn to be placed in the crib.

The space 16 within the crib which houses the bins is separated from the entry way 17 by the end bars 25 which are carried between two studs positioned close together both on the front and back walls of the crib, as indicated at 11ª in Fig. 2. These bars 25 are placed one above the other and are held in spaced relation to each other by end blocks 26 attached to them adjacent their ends but on one edge. The blocks 26 thus act as spacing bars for the blocks and will permit the free circulation of air between the bars when the latter are mounted between the studs 11ª to provide an end wall for the several bins of which the bars 22 constitute the bottoms.

The bars 25 are removable for the purpose of providing access to bins to remove the corn therefrom and when they are removed for this purpose, or for any other purpose, an appropriate storage space is designed for them. This storage space is provided at the end of the crib on the right hand side of the door 18, the studs 11ᵇ which are spaced from each other both on the front and back walls permitting the placing between them of the bars 25 when the latter are not used.

The space on the front wall between the left hand end wall and the first stud 11ª and between the plates 10 and 7 is closed by a plurality of gates or doors 26 which are hingedly attached to the plate 10 and swing upwardly to receive the fastening devices 27 carried by the plate 7. To provide for a person climbing up on the top of the corn in the uppermost bin when the bin is fully stored so that he may close the doors if the latter are open there is provided a ladder adjacent the door 18, this ladder comprising the rungs 28 which are secured to the right hand stud 11ª on the front wall and the stud 11 adjacent the door 18. It will thus be observed that the latter is on that side of the crib where the roof is highest and a person thus is able to climb up the top of the corn in the top bin without interference from the roof.

In the use of the improved crib, bars 22 are taken from the storage space between the stud 11ᵇ where they were placed when the crib was empty and are placed on the lowermost stringers 20 between the staples 23 attached thereon. A sufficient number of these bars is employed to provide a bin extending from the left hand end wall of the crib to the studs 11ª and enough end bars 25 are placed between these studs to extend the end wall of this bin up to the stringers 20 next above. The doors 26 are then opened by disengaging the fastenings and allowing them to drop. The corn is then thrown into the bin thus provided through the openings provided when the doors are dropped. When this bin has been filled to the height or approximately to the height of the second stringers 20, leaving room for free circulation of air between the bins, a second set of bars 22 is placed on the middle stringers 20 and a new end wall for this new bin thus provided is made by placing additional bars 25 on those which were formerly placed, this second set of bars being extended to the upper stringers 20.

This new bin thus provided is then filled as was the former bin. When a third bin is provided by placing bars 22 on the stringers 20 its end wall is formed by employing additional bars 25. When the third bin has been filled the person engaged in the operation may then close the doors 26 by climbing up the ladder as aforesaid and on top of the corn in the top bin when he can reach out and raise the doors 26 to secure the fasteners 27 thereto. It will thus be observed that the crib provides a plurality of bins and that air may circulate through the bottoms, sides and ends of these bins and between them and even though the corn placed therein contains much sap the air circulation is sufficient to completely dry the corn without spoiling.

After the corn has been thoroughly dried and it is desired to empty the bin the topmost end bars 25 are removed and placed in the storage space which lets the corn fall on the floor of the entry from the adjacent end of the topmost bin and which will expose the front slats on the bottom of the bin and continue to remove slats and bars as the corn falls to the solid floor where it can be scooped up and thrown into a wagon. (It is impossible to shovel corn off of those slats.)

The invention having been described, what is claimed as new and useful is:

1. A corn crib structure having side walls, formed of spaced slats, stringers carried by opposite walls and arranged in pairs in super-posed spaced relation, a plurality of removable bars spanning each pair of stringers, staples inserted in the upper edges of each pair of stringers and serving as spacing means for the bars, and staples inserted in the under faces of the bars adjacent their ends and bearing laterally against the stringers to preclude longitudinal movement of the bars.

2. A corn crib structure having side walls, formed of spaced slats, stringers mounted on opposite side walls and arranged in pairs in super-posed spaced relation, a plurality of removable bars spanning each pair of stringers to provide a plurality of super-posed knock-down bins, and a knockdown end wall for the bins composed of removable transverse bars provided with positive spacing means between them.

In testimony whereof he affixes his signature.

GEORGE W. ROBERTSON.